(12) United States Patent
Blohm

(10) Patent No.: US 9,566,893 B2
(45) Date of Patent: Feb. 14, 2017

(54) CARGO NET AND RELATED METHOD OF USE

(71) Applicant: Ratchet Net, LLC, East Grand Rapids, MI (US)

(72) Inventor: Melvin R. Blohm, East Grand Rapids, MI (US)

(73) Assignee: Ratchet Net, LLC, East Grand Rapids, MI (US)

( * ) Notice: Subject to any disclaimer, the term of this patent is extended or adjusted under 35 U.S.C. 154(b) by 103 days.

(21) Appl. No.: 14/582,439

(22) Filed: Dec. 24, 2014

(65) Prior Publication Data

US 2015/0298596 A1 Oct. 22, 2015

Related U.S. Application Data

(60) Provisional application No. 61/980,975, filed on Apr. 17, 2014.

(51) Int. Cl.
*B60P 7/08* (2006.01)

(52) U.S. Cl.
CPC ............ *B60P 7/0876* (2013.01); *B60P 7/0823* (2013.01)

(58) Field of Classification Search
CPC ....... B60P 7/0823; B60P 7/0876; B60P 7/083; B60P 7/0807; B60P 7/0815; B60P 7/0853; B60P 7/135; B61D 45/001; B61D 45/00; B61D 45/003; B61D 17/08; B60R 9/0485; B60R 11/00; B60R 13/01; B60R 2011/0003; B60R 2011/0071; B60R 21/06; B60R 25/1004

USPC .. 410/96, 105, 80, 100, 97, 101, 115, 98, 7; 296/100.16, 182.1, 3, 32, 39.9, 43, 50; 414/607
See application file for complete search history.

(56) References Cited

U.S. PATENT DOCUMENTS

| | | | | |
|---|---|---|---|---|
| 3,377,044 A | * | 4/1968 | Jackson | B60P 7/0846 188/371 |
| 3,961,585 A | * | 6/1976 | Brewer | B60P 7/0876 294/77 |
| 5,320,566 A | * | 6/1994 | Low, Jr. | B63C 9/26 441/80 |

(Continued)

OTHER PUBLICATIONS

41"×80" Trailer Cargo Net with Ratchets & E-Track Fittings, downloaded from http://www.uscargocontrol.com/Van-Trailer-Products/Heavy-Duty-Trailer-Cargo-Nets/41-x-80-Trailer-Cargo-Net-with-Ratchets-E-Track-Fittings, Dec. 10, 2014.

*Primary Examiner* — Glenn Dayoan
*Assistant Examiner* — Sunsurraye Westbrook
(74) *Attorney, Agent, or Firm* — Warner Norcross and Judd, LLP

(57) ABSTRACT

A cargo net including a body having a network of structural members, a first end and a second end, each end defining a sleeve and/or including an elongated strap engagement base. First and second straps, separately formed from the body, ends, sleeves and/or bases, are disposed through the respective sleeves, and/or over the respective bases at the ends. Where the ends include strap slots on opposite ends of the bases, the straps can be weaved through the slots and over the bases. The straps can be ratchet straps and can be generally slidably mounted through the sleeves and/or over the bases or through the strap slots. The ratchet straps can be tightened, thereby further securing cargo under the cargo net. The body, first end, second end, sleeves and/or bases can be monolithically formed as a single piece structure. A method of using the cargo net also is provided.

10 Claims, 15 Drawing Sheets

(56) References Cited

U.S. PATENT DOCUMENTS

| | | | | | |
|---|---|---|---|---|---|
| 5,452,973 | A | * | 9/1995 | Arvin | B60P 7/0876 410/117 |
| 6,817,644 | B2 | * | 11/2004 | Moore | B60R 7/005 296/24.43 |
| 6,948,896 | B2 | * | 9/2005 | Zhan | B60P 7/0876 410/100 |
| 6,983,970 | B2 | * | 1/2006 | Bateman | B60R 21/06 296/24.43 |
| 7,217,074 | B1 | * | 5/2007 | Huber | B60P 3/40 410/100 |
| 8,292,559 | B1 | * | 10/2012 | Foggy | B60P 7/0876 410/96 |
| 8,905,803 | B2 | * | 12/2014 | Hobbs | A61G 1/013 182/138 |

* cited by examiner

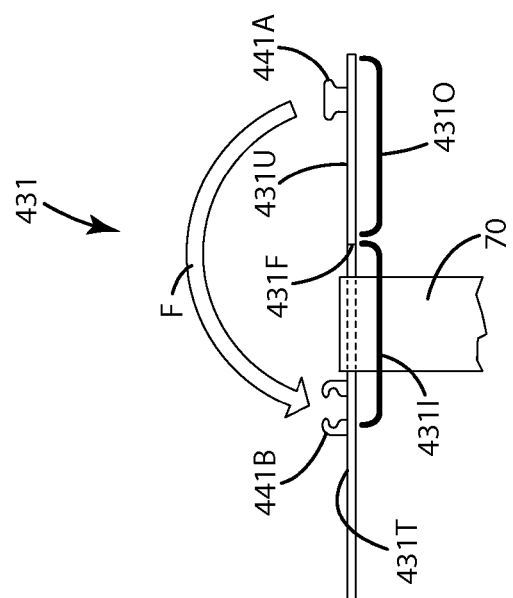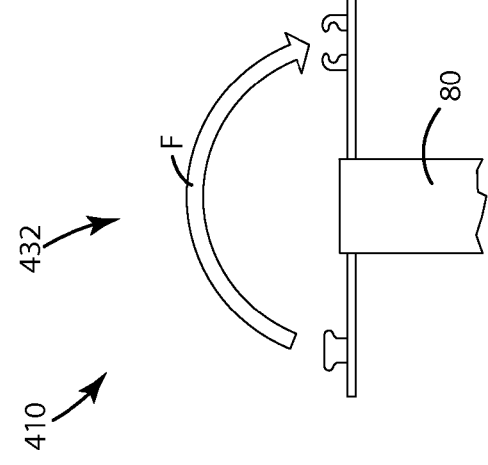

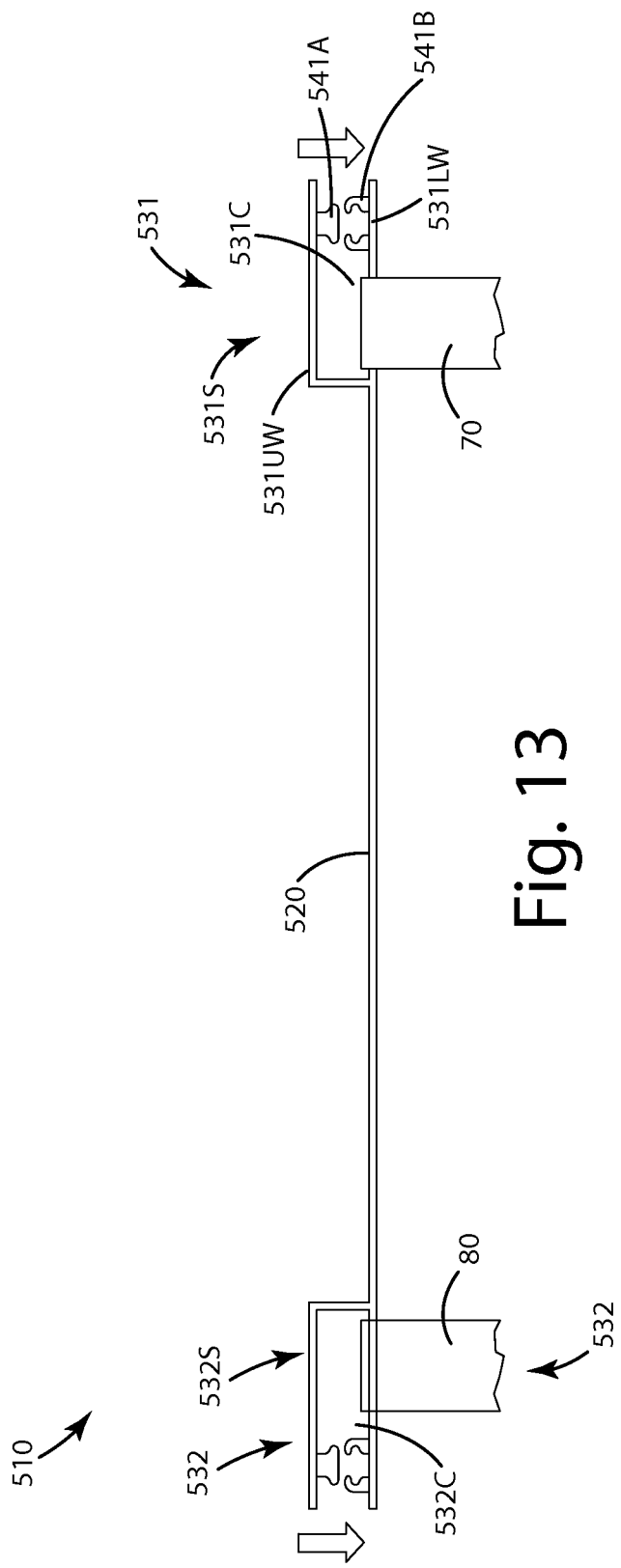

CARGO NET AND RELATED METHOD OF USE

BACKGROUND OF THE INVENTION

The present invention relates to load securing devices, and more particularly to a cargo net suitable for holding or retaining in position miscellaneous cargo during transit.

There are many conveyances that can be used to transport cargo. For example, trucks, trailers, semis, flatbeds and pickup trucks all include some sort of bed upon which cargo can be placed and transported. Typically, local or regional ordinances mandate that the cargo be secured to the conveyance in a safe and consistent manner to prevent the cargo from falling off the conveyance and creating a road hazard or damaging another vehicle on the road.

There also are many cargo securing devices. One popular device is the cargo net. Cargo nets typically are constructed from a network of crisscrossed, wide nylon or fabric webs that are stitched together at intersections. The cargo net can include a perimeter extending around the network of crisscrossed webs.

When the cargo net is applied or draped over an underlying load of items on a transport bed or pallet, the cargo net is typically secured to the same with rope, string and/or cords (for example, bungee cords). Usually the rope or string can be wrapped around portions of the perimeter, and further attached to the bed. In many cases, the rope or string is cinched tightly to pull the cargo net downward along the perimeter where the same is attached. Alternatively, bungee cords can be hooked onto the perimeter web, and further hooked under tension to the bed for securement of the net over the underlying cargo.

While conventional cargo nets secure most loads, they still have some shortcomings. For example, the webs can be constructed from a low friction material, such as nylon. Accordingly, the web slides or moves relative to underlying loaded items. In turn, the items can move around in transport, which might damage them. Further, many cargo nets only have a load holding strength that is as good as the rope, string or cords that secure the net to the bed. If the securement is not firm enough, the items or load under the net can move or shift, which can potentially cause damage. Additionally, conventional cargo nets typically are secured only around their outer perimeter. If the perimeter web fails at a point of attachment to a rope, string or cord, that portion of the net can become loose and the underlying cargo can be subject to dislodgement and/or damage. Moreover, with only the perimeter being pulled or tightened relative to the bed, sometimes the holding strength or tightness of the net inward from the perimeter is reduced.

SUMMARY OF THE INVENTION

A cargo net is provided, including a body, a first end and a second end, each end including a sleeve and/or an elongated strap engagement base. First and second straps, separately formed from the body, ends, sleeves, and bases are disposed through the respective first and second sleeves, and/or the strap slots defined by the strap engagement bases. Optionally, the straps can be in the form of ratchet straps and can be generally slidably mounted through the sleeves and/or through the strap slots. The ratchet straps can be tightened, to secure the body over underlying cargo, and further secure the cargo under the first and second ends.

In one embodiment, the sleeves are in the form of tubular structures extending laterally across and traversing a longitudinal axis of the cargo net. The sleeves can be of a variety of cross sectional shapes, each sufficient to accommodate a strap therethrough. As one example, the cross section of a sleeve can be generally rectangular, having a width greater than a height. As another example, the cross section can be box, circular, triangular or oval shapes.

In another embodiment, the first and second sleeves can be disposed substantially only on the opposite first and second ends of the cargo net. In this manner, when the straps through the sleeves are secured, the forces exerted by the straps at the ends pull down on the sleeves, and thus the underlying load. This in turn secures down the opposing ends of the cargo net so that cargo cannot escape from under the net.

In yet another embodiment, the first end and second ends can include the elongated strap engagement bases, which can extend widthwise across the first end and the second end, respectively. At opposing ends of the strap engagement bases, the one or more strap slots can be defined. The strap slots are sized so that the first and second straps, and their attachment elements, such as a hook, can be inserted and extended through the slots. Optionally, a strap extends through a first strap slot on one end of the elongated strap engagement base, across and generally over a body of the strap engagement base, and then back through a second strap slot on an opposite end of the elongated strap engagement base.

In still another embodiment, the cargo net body can include a first perimeter and a second perimeter, respectively disposed at or adjacent the first and second ends, and joined with the respective first and second sleeves. The body can be constructed from a network of intersecting structural members. With the body constructed from the elastomeric material, the network of structural members can be resilient, stretchable and readily conformable to a load over which the cargo net is placed to provide extra contact and holding strength to items in the load.

In even another embodiment, the cargo net body can include a first perimeter and a second perimeter, respectively disposed at or adjacent the first and second ends, and joined with respective first and second elongated strap engagement bases. The body can be constructed from a network of intersecting structural members, and optionally, an elastomeric material so that the network of structural members can be resilient, stretchable and readily conformable to a load over which the cargo net is placed.

In yet another embodiment, the cargo net body can include a third perimeter and a fourth perimeter, each joined with the first perimeter and second perimeter. The third perimeter and fourth perimeter can extend from the first end toward the second end, and can be joined with the sleeves and/or elongated strap engagement strips as well. The third and fourth perimeters generally can be parallel to and extend along opposite sides of the longitudinal axis of the cargo net.

In even another embodiment, the third and fourth perimeters can include inward facing and outward facing surfaces. The inward facing surface can be joined with the network of structural members. The outward facing surface can include one or more attachment elements. The attachment elements can be in the form of tabs or flanges that extend outward from the third and fourth perimeters, generally away from the longitudinal axis.

In a further embodiment, the tabs or flanges can define one or more apertures sufficiently sized for a rope, string or cord to be fitted therethrough to attach the same to the cargo net. These elements can be further secured to a bed or pallet to further secure the cargo under the net, in addition to the securement provided by the first and second straps.

In still a further embodiment, the outward facing surfaces of the third and fourth perimeters can define apertures or have loops associated therewith. These apertures can likewise be sufficiently sized for a rope, string or cord fitted therethrough.

The current embodiments provide a simple and effective cargo net that consistently and forcefully secures a load to a transport bed, pallet or other device. With the straps associated with the sleeve and/or strap engagement bases, and network of structural members, the current embodiments can provide multiple layers of protection for underlying cargo. For example, the straps secured to the bed or pallet optionally provide a first securement exerting substantial force to secure the cargo. In addition, the body, with its network of structural members, secures cargo between the straps. Further, where a lower wall of the sleeve, constructed from elastomeric material, is disposed between the strap and underlying cargo, that sleeve can provide enhanced grip on the underlying cargo that otherwise would not be realized if only the strap engaged the load. Finally, where an elongated strap engagement base is disposed between the strap and underlying cargo, that base can provide enhanced grip on the underlying cargo.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 5A is a close-up view of a ratchet associated with the straps;

FIG. 11 is a side view of the fourth alternative embodiment of the cargo net illustrating the ends of the cargo net before a closure is secured over respective straps;

FIG. 12 is a side view of the fourth alternative embodiment of the cargo net with the closure secured over the respective straps;

FIG. 13 is a side view of a fifth alternative embodiment of the cargo net including a different configuration of the closure;

DETAILED DESCRIPTION OF THE CURRENT EMBODIMENTS

Figure 1:
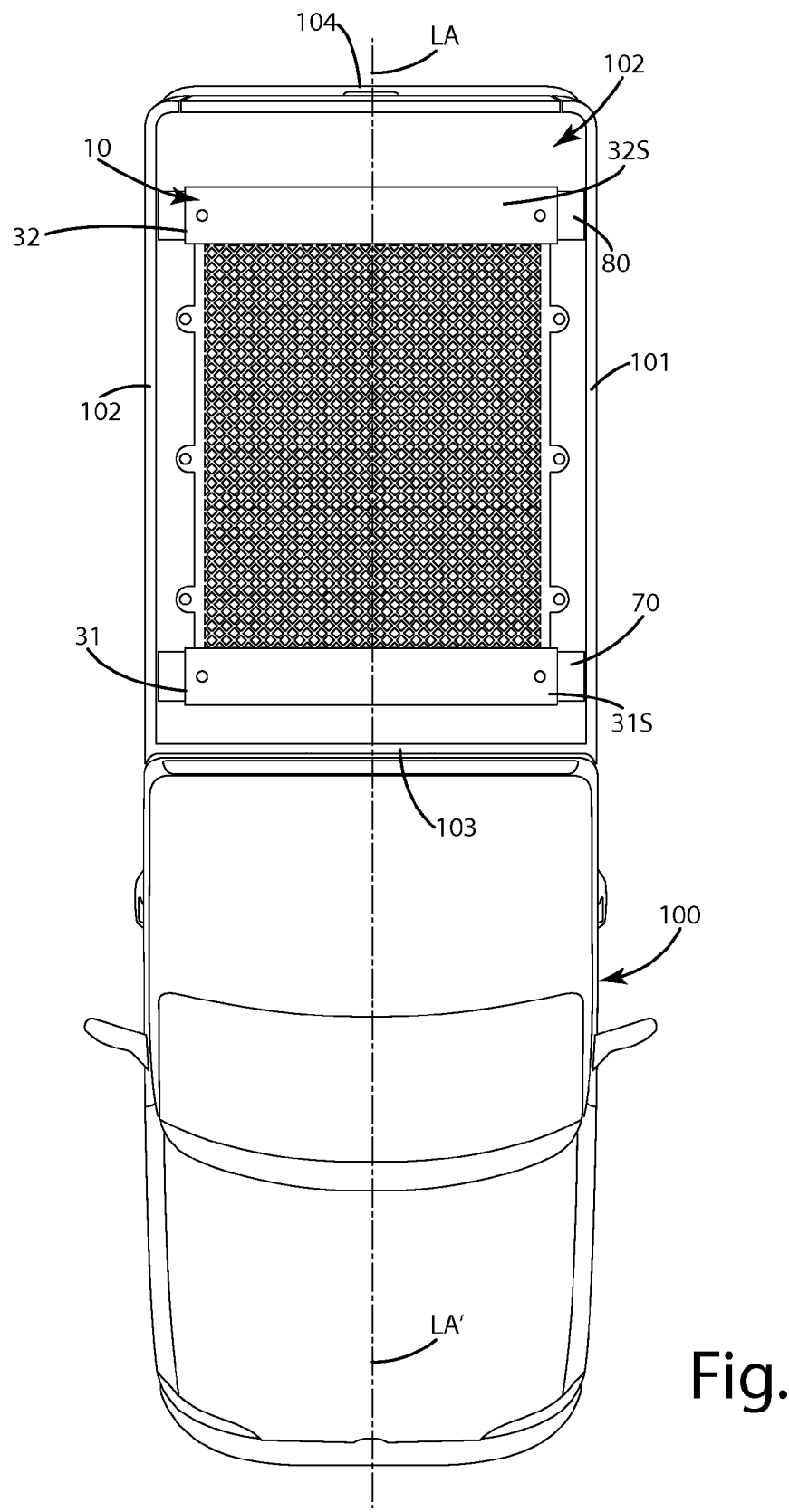
FIG. 1 is a top view of a conveyance, for example a pickup truck including a truck bed, within which a cargo net of a current embodiment is secured.

A cargo net according to a current embodiment is illustrated in FIGS. 1-5 and generally designated 10. As shown in FIG. 1, the cargo net 10 is utilized in the bed 102 of a conveyance 100. Although described in conjunction with securing cargo relative to a transport bed such as the truck bed 102 of a pickup truck 100, the cargo net is well suited for securing cargo to pallets, within containers or other shipping or freight articles. Further, although described in conjunction with a pickup truck as the conveyance, the cargo net can be utilized in a variety of other conveyances used to transport cargo. Specifically, the cargo net can be used in connection with light or heavy duty trucks, trailers, semis, flatbeds, tractors, wagons, industrial equipment, agricultural equipment, recreational vehicles, vessels and the like. As another example, the conveyance can be a human or pack animal. In this case, the cargo net can be secured over cargo carried on a pack or other structures. Additionally, although the transport bed is described in conjunction with a pickup bed 102 including first 101 and second 102 opposing sides, as well as a front and rear 103 and 104, respectively, the cargo net 10 can be used in conjunction with any type of transport bed on any type of conveyance as described herein.

Figure 2:
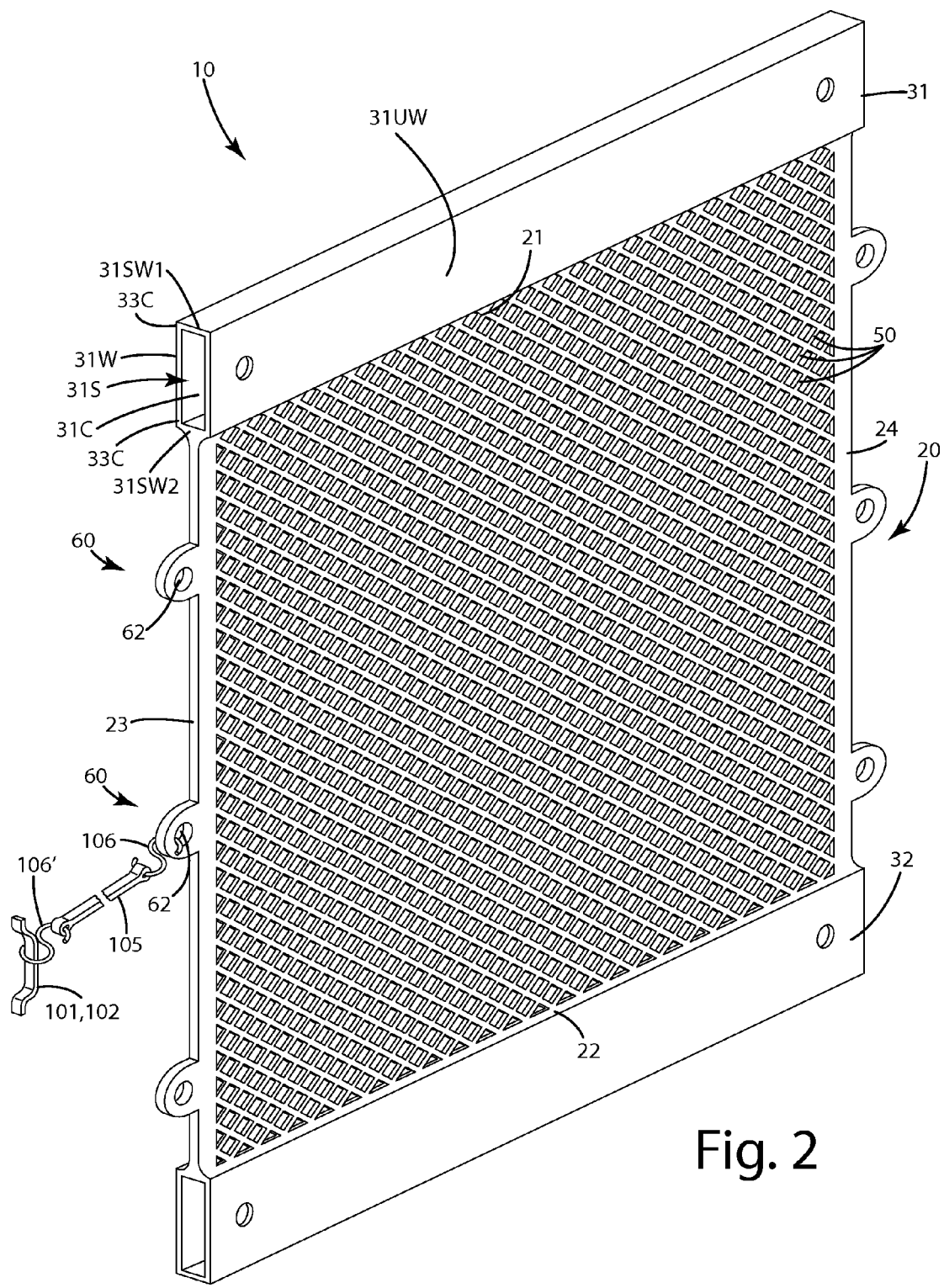
FIG. 2 is a perspective view of the cargo net illustrating a sleeve cavity defined by an end of the cargo net.
Figure 3:
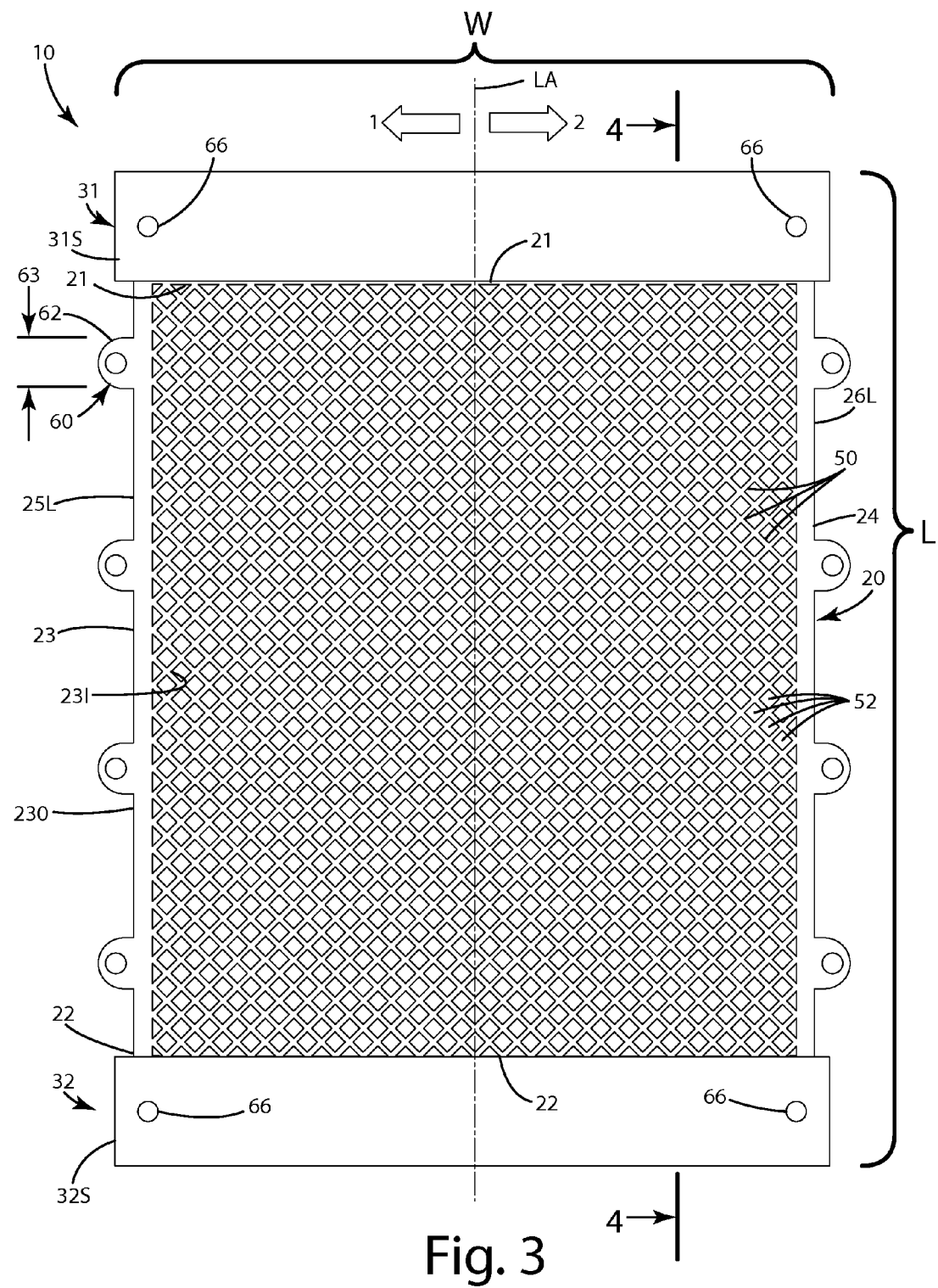
FIG. 3 is a top view of the cargo net.

As shown in FIGS. 1-5, the cargo net 10 can include a body 20, a first end 31 and second end 32. The first end 31 can form a sleeve 31S. The second end 32 can form a sleeve 32S. Those sleeves can be identical so only sleeve 31S will be described here. The sleeve 31S can generally define a sleeve cavity 31C that extends through the end 31 and/or sleeve 31S from a first side to a second side as shown in FIG. 3. The body 20 can include multiple structural members 50, which as illustrated, can be in the form of multiple, criss-crossed, elongated members that form a tiling pattern. The particular pattern of the body can be selected depending on aesthetic considerations as desired.

The cargo net 10 can be constructed to be an integral, monolithically formed single piece structure. For example, the body 20, first sleeve 31S, first end 31, second sleeve 32S and second end 32 can all be monolithically formed as a single piece structure. This structure can be constructed from material that extends homogeneously throughout each of the components, yet is shaped to provide the physical structure of the respective components. In one construction, the material can be a molded elastomeric material, such as rubber. Of course, this material can be any type of material that enables the body and/or the sleeves to conform to the contours of an underlying cargo load. Optionally, the material can be a thermoplastic material, a polymer, a composite reinforced polymeric material, thermoplastic urethane and the like. Further optionally, the material can be selected so that the body is relatively flexible and can readily deform to accommodate the contours of underlying cargo. Even further optionally, material also can be stretchable and/or elastic so that when placed under significant loads or tension, the cargo can stretch the structural members 50 of the body 20 a predetermined amount without breaking them. After the cargo net 10 is removed from the cargo, the structural members can return to an unstretched state.

As shown in FIG. 3, the cargo net can include a longitudinal axis LA. The longitudinal axis LA can be used as a reference axis for description of different components as noted below. Laterally disposed relative to the longitudinal axis LA is a first side 1 and a second side 2. The cargo net 10 also can be constructed to include a length L and a width W. In the embodiments illustrated, which are suitable for a pickup truck, the length L can be about 72 inches and the width W can be about 60 inches. Of course for different applications such as trailers, flat beds, semis, pallets and the like, the length and width can be varied significantly. As one example, the width can be about 1 inch to about 1,000 inches, further optionally about 10 inches to about 500 inches; even further optionally about 100 inches to about 250 inches. The length L can be optionally about 1 inch to about 4,000 inches, further optionally about 10 inches to 2,000 inches, and even further optionally about 100 inches to about 1,000 inches. Again, depending on the application, different lengths and widths can be selected.

The body 20 as mentioned above can include multiple structural members 50. The structural members can be of a variety of constructions. As illustrated, multiple structural members extend laterally across and/or intersect at the longitudinal axis LA of the cargo net 10. The structural members can form a pattern of openings 52 that are defined by the body 20. These openings 52 can be selectively dimensioned so that the members around the openings capture, retain and hold most items in a cargo load over which the cargo net is secured. In some cases, the openings 52 can be about 2 inches. Of course for larger objects these openings 52 can be optionally about 2 inches to about 4 inches or other dimensions depending on the particular application.

The structural members 50 can be solid members of a circular, elliptical or rounded cross section—or simply of a flat planar and generally rectangular cross section. Of course other cross sections can be selected depending on the particular application. As an example, the cross section of the different structural members 52 can be rectangular, triangular, polygonal or some other custom shape depending on the cargo with which the net is to be used. The structural members generally extend across a portion of the width W and along a portion of the length L of the cargo net 10.

The body 20 including the structural members 50 can be bounded by a first perimeter 21, a second perimeter 22, a third perimeter 23 and a fourth perimeter 24. The first perimeter 21 and the second perimeter 22 can extend across and/or traverse to the longitudinal axis LA. The first perimeter 21 can be bounded by the first end 31 and in particular the sleeve 31S of the first end 31. The first perimeter 21 need not be a continuous linear perimeter, and instead can be a plurality of structural members that are joined with one another and/or the sleeve 31S. The second perimeter 22 can be located at the opposite end of the end 32 of the cargo net 10. The second perimeter 22 can be similar to the first perimeter, except that it is attached to the second end 32 and particularly the second sleeve 32S. The second perimeter 22 extends laterally across the longitudinal axis LA from the first side 1 to the second side 2. It also can extend from the first lateral edge 25L of the body 20 to the second lateral edge 26L of the body 20.

Referring to FIGS. 2 and 3, the third perimeter 23 and fourth perimeter 24 of the body 20 can extend along and/or be adjacent the first lateral edge 25L and fourth lateral edge 26L. This third perimeter 23 can be disposed substantially only on the first side 1 of longitudinal axis LA. The fourth perimeter 24 can be disposed substantially only on the second side 2 of longitudinal axis LA opposite the third perimeter 23. These perimeters 23 and 24 optionally can be parallel to one another and the longitudinal axis. The perimeters 23 and 24 further optionally can be perpendicular to the sleeves 31S and 32S. Generally these perimeters can be similar in structure so only the third perimeter 23 will be described here.

As shown in FIG. 3, the third perimeter 23 extends from the first sleeve 31S to the second sleeve 32S and is integrally formed therewith. This perimeter can be about 0.5 inches in thickness and about 0.5 inches in width. Of course other dimensions may be selected depending on the particular application and the desired strength along the perimeter of the cargo net 10. The third perimeter 23 can include an inward facing surface 23I and an outward facing surface 23O. The inward facing surface 23I can be joined with the plurality of structural elements 50 of the body 20. The outward surface 23O can be disposed opposite from the inward facing surface 23I and generally form one of the lateral outer most surfaces of the cargo net.

As shown in FIGS. 2 and 3, the third perimeter 23, as well as the fourth perimeter 24, can include one or more tabs. As used herein, tabs generally refer to tabs, flanges, extensions, projections or similar structures. The tabs 60 can extend laterally outwardly away from the lateral edge 25L. Corresponding tabs 60 can be diametrically mounted across the longitudinal axis LA on the respective third perimeter 23 and fourth perimeter 24 to provide symmetric loading and attachment points. The tabs 60 can define one or more holes or apertures 62. These apertures can be sized sufficient to accommodate the hook or other attachment element of a cord, rope or string to further secure the cargo net, and in particular the body, to a bedside 101 and more generally to the bed 102 as illustrated in FIG. 2. As used herein, a cord can be any type of bungee cord, string, rope, fabric, tube or other elongated element. The cord 105 shown in FIG. 2 can include a first attachment element 106 and a second attachment element 106'. The first attachment element 106, which can be a hook, can be positioned with the hook through the aperture 62 defined by the tab 60. The second end of the cord 105 can be secured via the attachment element 106', which can also be a hook, to the bedside 101, and optionally a structure or opening of that bedside as illustrated in FIG. 2.

Optionally, the tab can be about 1 inch to about 4 inches in length 63. Of course other dimensions can be selected depending on the particular loads to be exerted on the tabs and perimeters. Further optionally, the length of the tab 64 can be about 1 inch to about 4 inches, but also can vary depending on the application and loads applied to the perimeter and cargo net in general.

The apertures 62 of the tabs 60 can be sufficiently sized to accommodate attachment elements of cords. As an example, the apertures can be optionally about 0.25 inches to about 3 inches in diameter, further optionally, about 0.5 inches to 1.5 inches. Again, these dimensions can vary depending on the application.

Although not shown, the tabs 60 can be formed in a different manner. For example, a cable, cord or other structure can be integrally molded with the perimeters 23 and/or 24. This other structure can form a loop that extends outwardly from the perimeter 23, and can be constructed from a different material. In some cases, the structure can extend along the third perimeter 23 from the first end 21 to the second end 22 and can include one or more loops that extend outwardly away from the perimeter 23 to form respective apertures through which portions of cords or other attachment devices can be secured. If desired, the perimeters 23 and 24 as well as the structural members 50 can be reinforced with cord, cable, fabric, rope or any other elongated reinforced elements to enhance the structural integrity and strength of the components within which they are embedded. In some cases however, these elements are not readily stretchable and/or deformable, so in such applications, these added support reinforcement elements may counter to a desired objective. Again, it depends on the application whether or not additional reinforcement elements are embedded within the formed single piece structure and/or its relevant components.

As shown in FIGS. 1 and 2, the sleeves 31S and 32S optionally can define one or more apertures 66 which can likewise be structured and dimensioned to accommodate the attachment elements of one or more cords for securement of those sleeves in a particular manner. However, when larger, substantial straps extend through the sleeves, the apertures 66 can be closed off and unable to accommodate smaller attachment elements of cords.

As shown in FIGS. 2 and 3, the sleeve 31S can be disposed adjacent the first end 31. The second sleeve 32S can be disposed adjacent the second end 32. Of course in other applications there may be one or more sleeves (not shown) disposed between the first and second ends generally extending across the body 20 and/or width W. These additional sleeves can be implemented or included in the cargo net 10 where additional load or cargo securing forces are desired, and in particular where the cargo may include larger, bulkier items more likely to move around.

With reference to FIG. 2, the sleeve 31S generally defines a first sleeve cavity 31C. It should be noted that the sleeves 31S and 32S can be generally identical, so only the first sleeve will be described herein. The first sleeve 31S can include a first sidewall 31SW1 and a second opposing sidewall 31SW2. These sidewalls can be distanced from one another, optionally about 1 inch to about 12 inches, further optionally about 4 inches to about 8 inches, and even further optionally about 6 inches. Of course these dimensions can vary depending on the particular application. The sidewalls 31SW and 32SW can extend across the width W of the cargo net 10, and can be traverse to longitudinal axis LA, and can extend from the first side 1 to the second side 2. Further, the first and second sidewalls can be parallel to one another.

Figure 4:
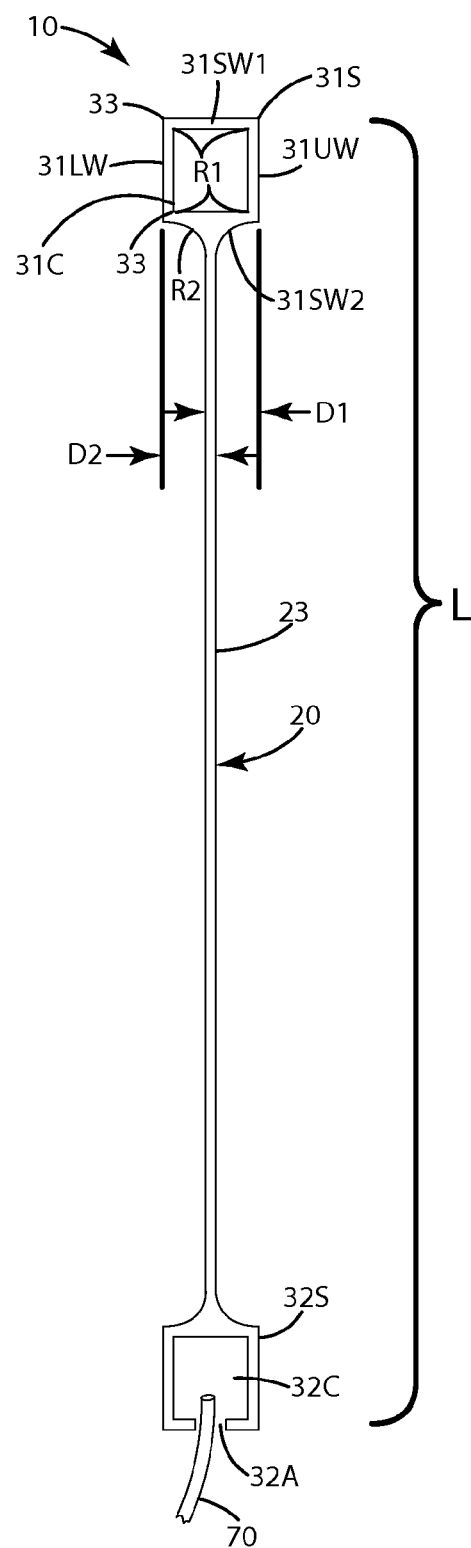
FIG. 4 is a section view taken along lines 4-4 of FIG. 3.

The first and second sidewalls, as shown in FIGS. 2 and 4, can be joined at corners 33C with a lower wall 31LW and an upper wall 31UW of the sleeve 31S. These corners can be filleted and/or include a radius R1. Optionally, this radius R1 can create a smoother transition between the sidewalls and the upper and lower walls to reduce cracking or separation of the walls at the corners 33C. The upper wall and lower wall can be parallel to one another and disposed on opposite sides of the sleeve cavity 31C. They also can be flat and extend across the longitudinal axis LA, transitioning from the first side 1 to the second side 2. The upper and lower walls also can be dimensioned larger than the sidewalls depending on the application. Optionally, the upper wall 31UW and lower wall 31LW can be substantially parallel to the body 20, but offset from the body a predetermined distance D1 or D2. These distances can be selected depending on the particular thickness of the cavity 31C and/or the strap with which the cargo net 10 will be used. Further optionally, the upper walls and the lower walls of the first sleeve 31S and second sleeve 32S can be substantially parallel to and aligned with one another.

As shown in FIG. 4, the sidewall 31SW2 can transition to the body 20 and/or perimeter 23. At this transition, the material forming the sidewall 31SW2 and the third perimeter 23 can be radiused to increase the amount of material between those elements and improve the securement of them to one another. The radius R2 can be optionally about 0.1 inches to about 2 inches, 0.5 inches to about 1 inch, or other dimensions depending on the particular application and the attachment of the sleeve to the body.

Figure 5:
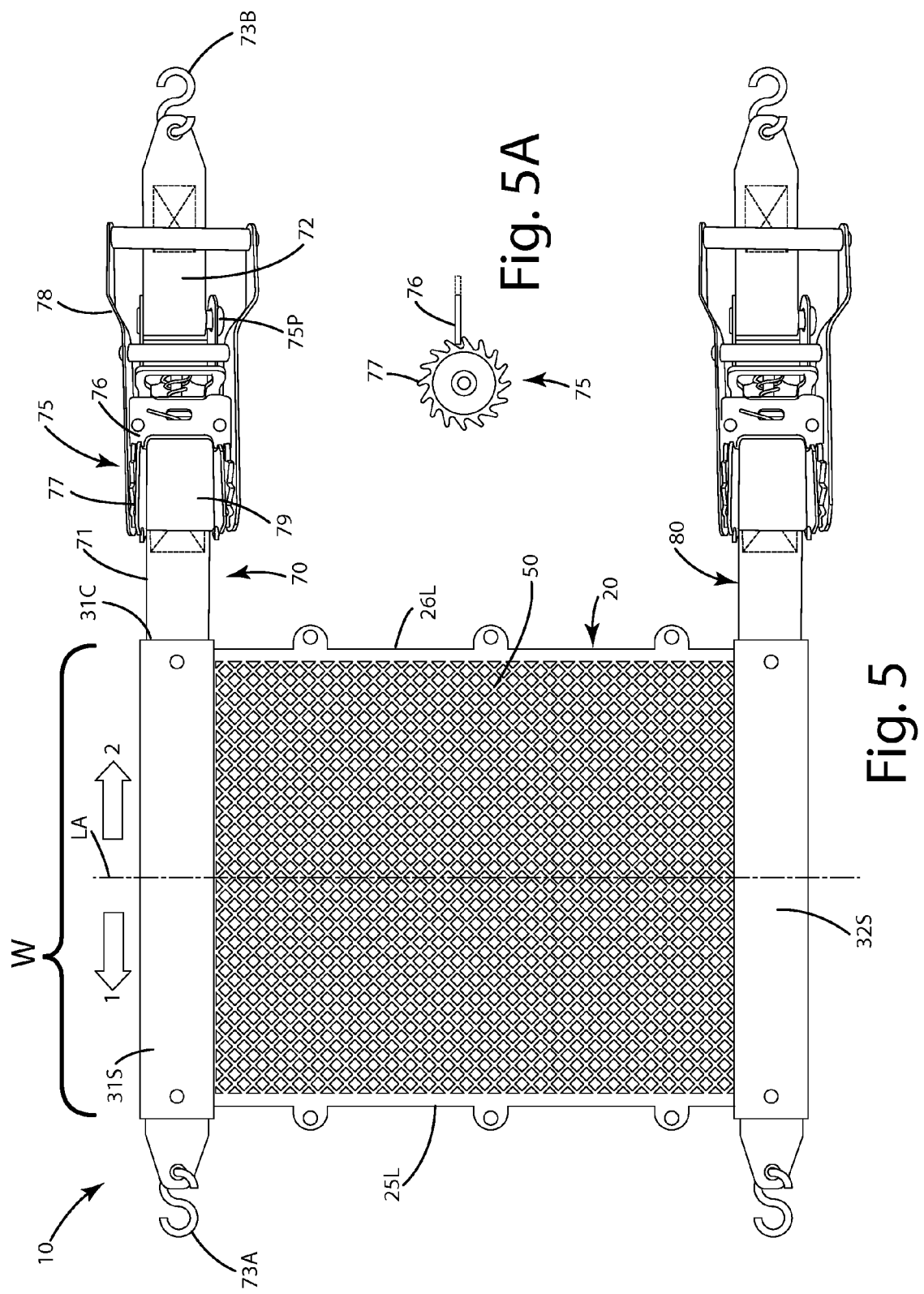
FIG. 5 is a top view of first and second straps disposed through first and second sleeves of the cargo net.

The cavity 31C and the sleeve 31S can be sized to accommodate one or more straps 70 and 80 as shown in FIGS. 1 and 5. Optionally, one or more of the sidewalls 31SW, 32SW and/or upper or lower walls 31UW, 31LW can be configured to include a slit or slot therein so that a strap can be easily fit into and enter the cavity of the sleeve. As an example shown in FIG. 4, the second sleeve 32S can include an aperture 32A which can be in the form of a slit, slot or other hole that can extend along a portion of the sleeve across a portion of the width W of the net. This aperture 32A can be sized so that the strap 70 (shown in cross section) can be easily inserted through the aperture 32A and into the cavity 32C. Of course other apertures can be included in the different respective walls of the sleeves depending on the particular application. Again these apertures 32A can be particularly helpful where attachment elements such as hooks associated with respective straps 70 and 80 are larger than the dimensions than the respective cavities 31C and 32C of the sleeves 31S and 32S.

The inward facing surfaces of the respective sidewalls 31SW1, 131SW2 and upper and lower walls 31UW and 31LW can be contoured to enable one or more of the straps 70, 80 to easily be extended through the cavity 31C. They also can be constructed so as to enhance the grip between the strap in the interior surfaces of the cavity 31C when the strap is tightened down.

Returning to FIGS. 1, 5 and 6, the cargo net of the current embodiment can be secured to a bed, pallet or other structure with one or more straps 70 and 80. These straps can be any type of strap that is of a sufficient length to extend through the sleeves 31S and 32S. As illustrated, the straps optionally can be in the form of ratchet straps. Because the ratchet straps 70 and 80 are generally identical, only the one ratchet strap 70 will be described herein. The ratchet strap 70 generally includes a ratchet mechanism 75. The ratchet mechanism 75 includes a lock 76 that engages a gear 77.

This is shown better in FIG. 5A. This lock 76 can be selectively engaged with a gear 77 or disengaged from a gear 77 to allow the ratchet mechanism to be operated. Generally, the ratchet mechanism operates with the lever 78. The user grasps and moves the lever 78 which in turn rotates the spool 79. The spool 79 rotates and accordingly the first elongated web 71 is spooled onto or off from the spool 71. The ratchet also can include a secondary connector and/or pin 75P to which a second elongated web 72 is attached.

The first and second elongated webs can generally be polymeric and can be of a variety of cross sections. As illustrated they are flat and constructed from a woven nylon material. The first elongated web 71 can extend through the sleeve 31S and more particularly can extend through the cavity 31C of the sleeve 31S. When tightened down, the first elongated web 71 primarily engages the lower wall 31LW of the sleeve 31S and can be disengaged from the upper wall 31UW and/or sidewalls 31SW1 and/or 31SW2. The first elongated web 71 extends laterally across the width W of the cargo net 10, from the first side to the second side 1, 2.

The strap itself 70 can extend beyond the first lateral edge 25L and the second lateral edge 26L on opposing first and second sides 1 and 2 of the longitudinal axis LA. Optionally, only the first elongated polymeric web 71 extends in both of these directions generally traversing the longitudinal axis LA. The first elongated web can also include a first attachment element 73A distal from the spool and the ratchet 75 in general. The second elongated web 72 can include a second attachment element 73B. These attachment elements are firmly secured to the ends of the respective elongated webs. Optionally, the attachment elements can be in the form of hooks, tongs, rings, D-loops or other structures capable of securing the strap ends to a bed, pallet or other structure and thereafter tightening down the ratchet straps 70, 80 with the ratchet mechanism 75.

As illustrated in FIG. 5, the ratchet mechanism 75 is located only on the first side 2 relative to the longitudinal axis LA. Further, the ratchet mechanism 75 need not be pulled through the cavity 31C for application to the cargo net. The ratchet mechanism optionally does not enter or otherwise become located within the sleeve 31S.

Figure 6:
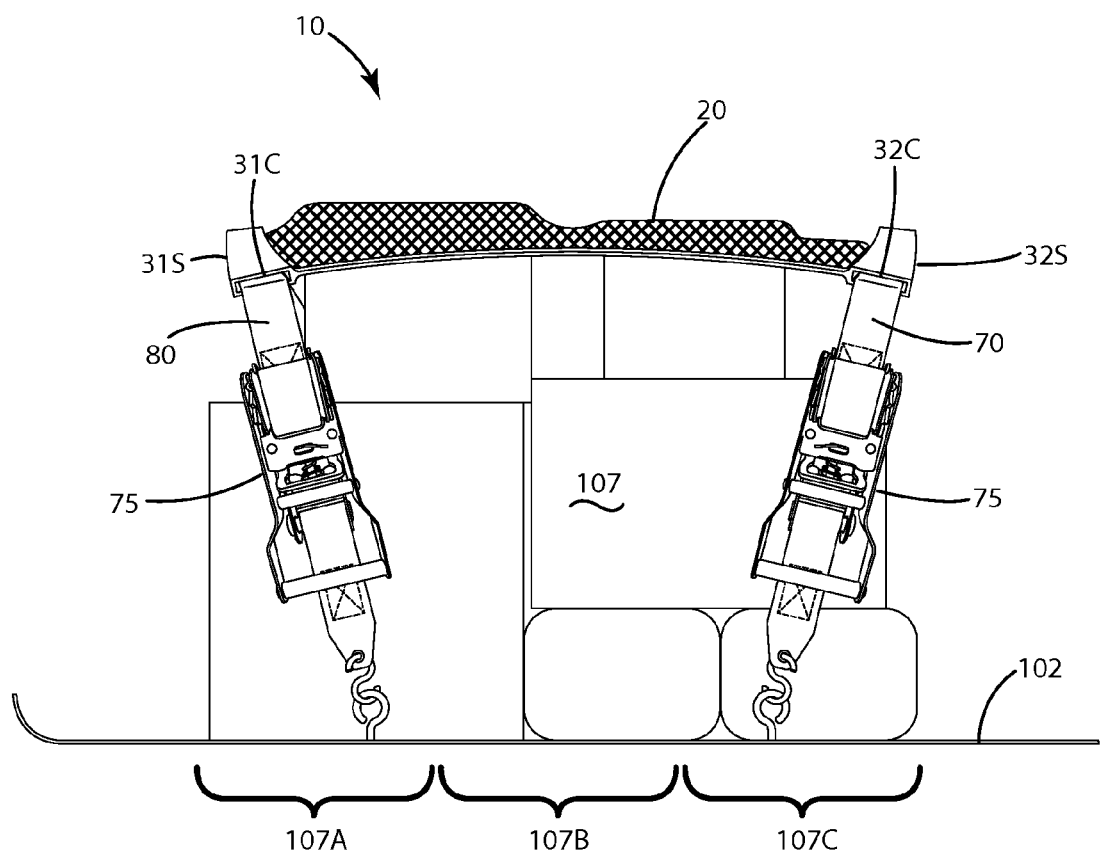
FIG. 6 is a side view of a cargo load secured with the cargo net.

Generally the straps 70 and 80 can be selectively tightened to secure cargo under the cargo net 10 with the body 20 securing a portion of the cargo located between the first end and the second end. For example as shown in FIG. 6, a cargo load 7 is disposed below the cargo net 10. Straps 70 and 80 extend through the sleeves 31S, 32S and are joined via attachment elements to the bed 102. The ratchet mechanism 75 is tightened. With this tightening, the sleeves 31S and 32S are drawn down upon opposing portions of the cargo load 107. Specifically, the straps 70, 80 tighten down and secure against the load portions 107A and 107C located below the respective sleeves 31S and 32S. The central portion 107B of the load is generally secured upon its upper most portion via the body 20 including the plurality of multiple structural elements which engage the cargo.

Operation of the cargo net 10 will now be described in further detail. As shown, the cargo net 10 is provided including its body 20, the multiple structural members 50, the first side 1 and the second side 2 disposed opposite one another across the longitudinal axis LA. Optionally, longitudinal axis LA of the cargo net 10 can be aligned with a longitudinal axis LA' of a vehicle as shown in FIG. 1 and/or bed 102 of the vehicle. As mentioned above, the ends include the first sleeve 31S and the second sleeve 32S. A user can extend the first strap 70 and the second strap 80 through the respective first and second sleeve cavities. In particular, the first elongated web 71 can be loaded or extended through the cavity 31C of the sleeve 31S. Generally the elongated web is extended so that it traverses across the longitudinal axis LA and protrudes beyond the first and second sides 1 and 2, and/or lateral edges 25L, 26L as shown in FIG. 5. With the first attachment element 73A protruding beyond the cargo net on one side and the second attachment element 73B protruding beyond the cargo net on the opposite side 2, these elements can be attached respectively to opposite sides of the bed 102.

The first 70 and second 80 straps can then be tightened so that the underlying load below the respective sleeves 31S and 32S is secured. This tightening can be achieved via any suitable means. In the current embodiments tightening can be accomplished using the ratchet mechanism 75. The user moves the lever 73 which turns the gears 77 and in turn rotates the spool 79. The spool spools and takes up a portion of the first elongated web 71. Thus, the overall length of the strap between the first and second attachment element is decreased or shortened. This in turn translates to an increased force or tension in the strap 71, which is transferred is a force to the sleeves and the underlying respective load portions. The lever can be repeatedly moved to spool on as much or little of the web 71 as desired to provide the appropriate amount of force tension and/or to hold down the load.

As shown in FIG. 6, the straps 70 and 80 are placed through the respective sleeves 32S and 31S. Where they are tightened down, those sleeves grippingly engage the underlying load portions for example 107A and 107C located directly beneath the sleeves. The straps 70 and 80 themselves can slide or move generally within the sleeve 31S and 32S and/or the respective cavities 31C and 32C with this movement. In some cases the straps can pull the respective load portions down and secure them in an exceptional manner. When the straps are tightened down, the body 20 of the cargo net 10 also operates to hold down the central portion 107B of the load. The body 20 and the respective structural members 50 also can deform stretch or otherwise conform to the contours of the underlying load portion 107B. This can be achieved via the optional elastomeric construction of the cargo net.

Figure 7:
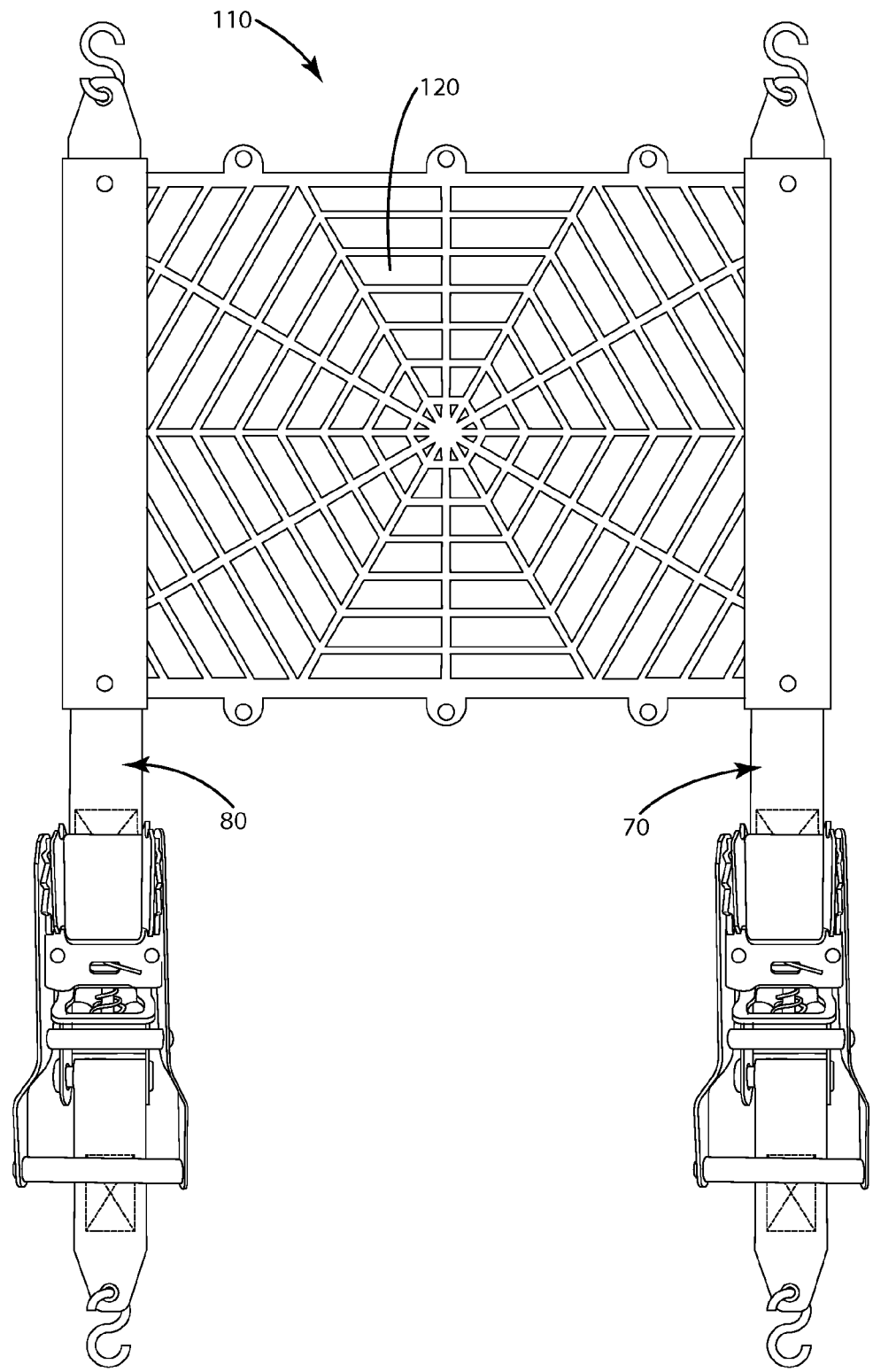
FIG. 7 is a top view of a first alternative embodiment of the cargo net including a different configuration of the structural members in the body thereof.

As shown in FIG. 7, an alternative embodiment of the cargo net 110 is illustrated. This cargo net 110 can include the features noted above in the above embodiments with several exceptions. For example, the body portion 120 can include a different aesthetic configuration. The structural members can generally be constructed to mimic an aesthetic spider web.

Figure 8:
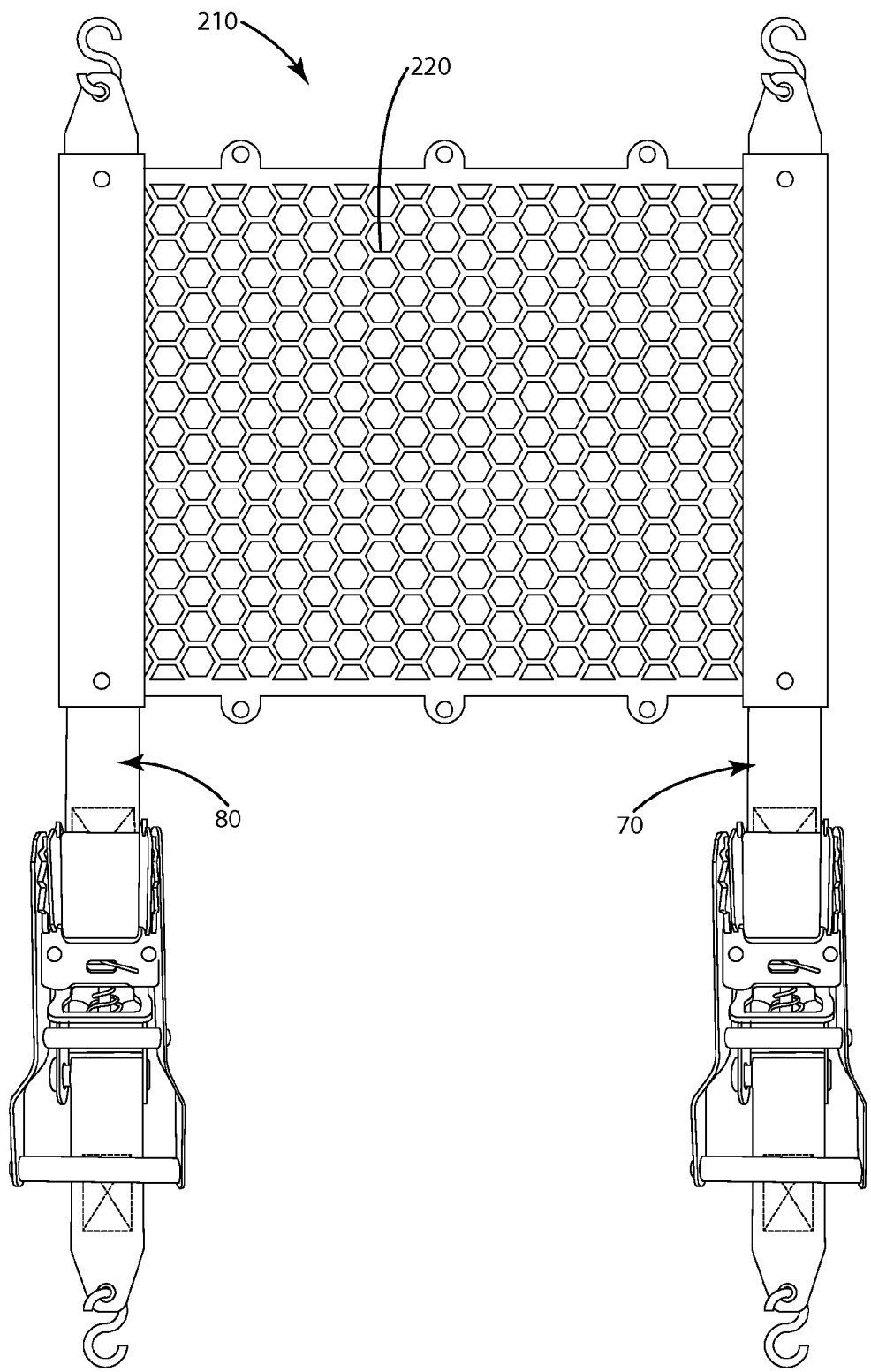
FIG. 8 is a top view of a second alternative embodiment of the cargo net including a different configuration of the structural members in the body thereof.

FIG. 8 illustrates a second alternative embodiment of the cargo net generally designated 210. This cargo net 210 can be similar to the embodiments described above with several exceptions. For example, the body portion 220 can be formed such that the structural elements generally produce an aesthetic honeycomb pattern.

Figure 9:
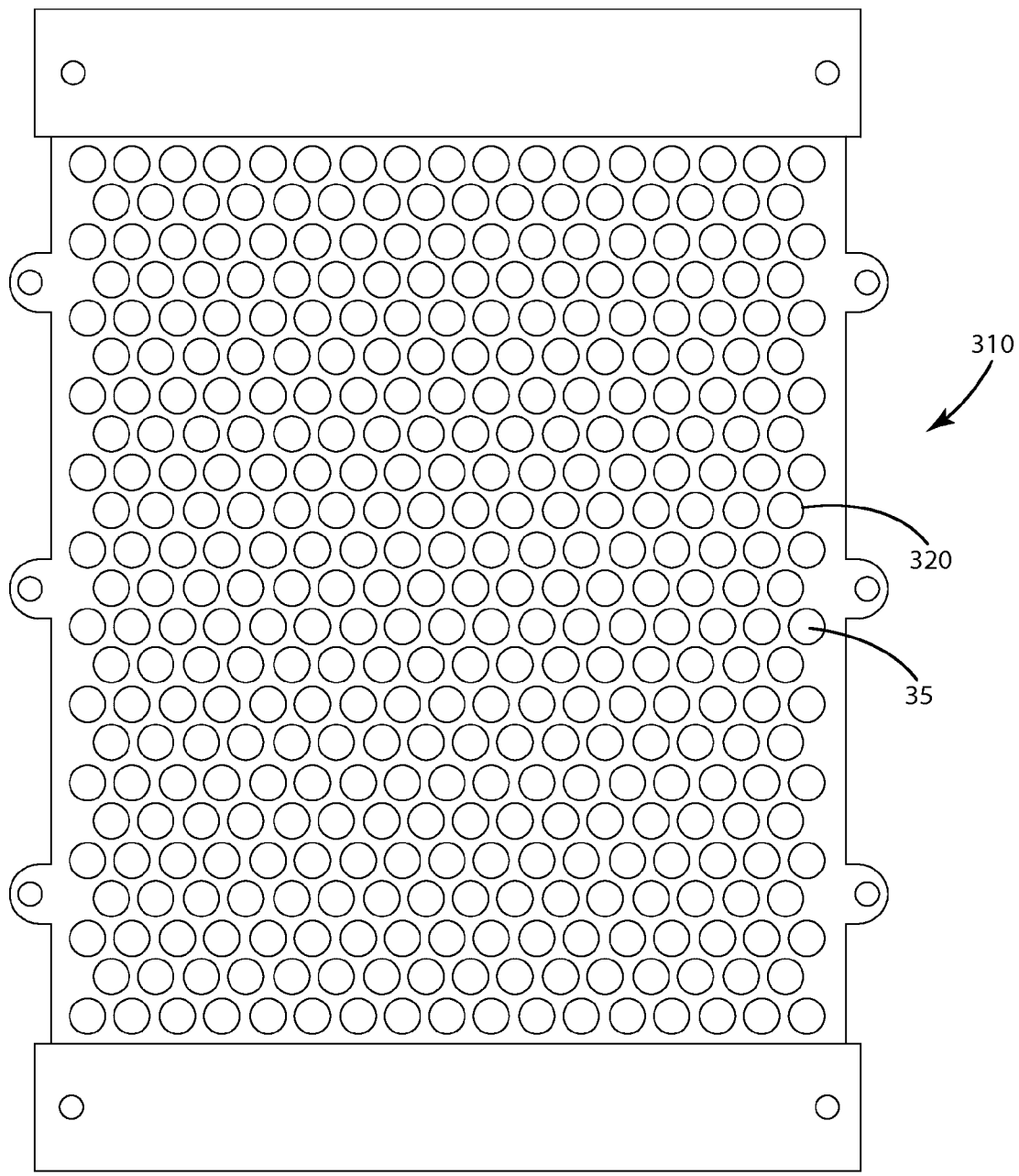
FIG. 9 is a top view of a third alternative embodiment of the cargo net including a different configuration of the structural members in the body thereof.

A third alternative embodiment of the cargo net 310 is generally shown in FIG. 9. This embodiment can be similar to the embodiments above with several exceptions. For example, the body 320 can be configured as a substantially flat sheet of material. Within the sheet of material 320, a plurality of apertures 352 can be defined. These apertures 352 can generally be in the form of circular shapes. Of course other shapes such as triangles, polygons, ellipses or other aesthetic shapes can be selected depending on the particular application.

Figure 10:
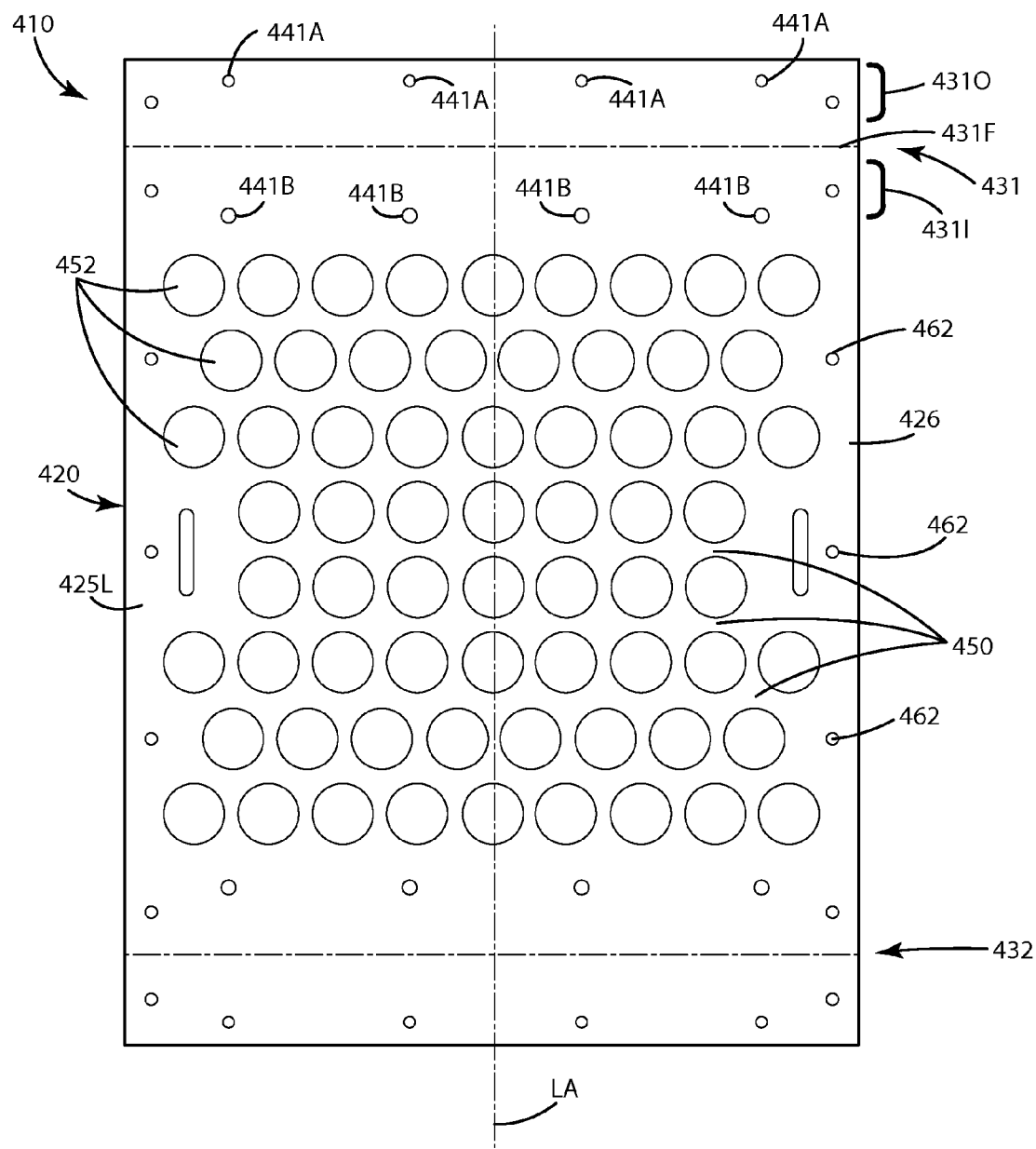
FIG. 10 is a top view of a fourth alternative embodiment of the cargo net including a different configuration of the ends and structural members in the body thereof.

A fourth alternative embodiment of the cargo net 410 is generally shown in FIGS. 10-12 and generally designated

410. This embodiment can be similar to the embodiments above with several exceptions. For example, the net 410 can be constructed to include a body portion 420 with a network of structural members 450 defining multiple apertures 452. The apertures 452 can be generally in the form of circular shapes, but of course other shapes such as triangles, polygons, ellipses or other aesthetic shapes can be selected depending on the particular application and load to be secured.

The ends 431 and 432 of the net 410 can be constructed differently from the embodiments above. For example the ends can include an overlap portion 431O and an optional fold 431F. These ends can be substantially similar to one another, so only the first end will be described here. The overlap portion 431O can be constructed so that it can be folded over upon the internal portion 431I of the net 410 near the end 431. The net optionally can include one or more closures 441A, 441B. These closures can as shown be in the form of corresponding snap structures, such as those including a snap stud and a corresponding snap ring. Of course, snaps can be replaced with other types of closures, for example, draw latches (adjustable and non-adjustable), draw pull latches, pull down loop draw latch catches and or fixed snap buckles. Further, if desired the one or more closures can be simple hook and loop fastener structures, such as Velcro®. Moreover, although the closures are shown intermittently disclosed along the respective portions of the cargo net, they alternatively could be disposed continuously across the entire overlap portion 431O and/or internal portion 431I, again, depending on the particular closure used and the desired securing strength of the same in relation to one or more straps 70, 80 associated with the respective ends of the cargo net 410.

Optionally, the cargo net 410 can be configured as a substantially flat sheet of material, such as those noted above in connection with other embodiments. The net can be void of any cavities or sleeves formed or molded directly into the structure of the cargo net 410 itself. Instead, the sleeves and corresponding cavities in the respective ends can be formed by folding over or otherwise deforming the ends of the cargo net onto another portion of the cargo net.

As mentioned above, the cargo net 410 includes a fold 431F. As shown in FIG. 11, the fold 431F can be any deformable, foldable or otherwise reconfigurable line or structure joining the overlap portion 431O and the internal portion 431I in a manner so that the overlap portion 431O can be moved in the direction of the arrows F. Generally, the cargo net 410 can be folded along the fold 431F or otherwise dynamically moved or altered to allow the overlap portion 431O to be folded over or otherwise placed adjacent the internal portion 431I. In so doing, the upper surface 431U of the overlap portion 431O is at least partially moved and/or flipped so that it faces downwardly, toward the upper surface 431T of the internal portion 431I when the overlap portion 431O is folded or otherwise moved relative to the internal portion 431I as shown in FIG. 12.

Although not shown, the fold 431F optionally can include some sort of living hinge, other hinge structure or folding structure to enable the overlap portion 431O to overlap and be moved toward and opposite the internal portion 431I of the cargo net 410.

The cargo net 410 also can include a longitudinal axis LA. Generally the fold 431F can be transverse to the longitudinal axis LA. Optionally, the fold 431F is perpendicular to the longitudinal axis LA.

The cargo net 410 and/or main body 420 can include first 425L and second 426L lateral edges disposed on opposite sides of the longitudinal axis LA. Optionally, located inwardly from these lateral edges 425L and 426L respective apertures 462 can be disposed. These apertures can be configured to receive attachment elements for secondary straps or other elements to secure the cargo net in regions distal from or between the first end 431 and second end 432.

The closures 441A and 441B can be aligned so that when folded or otherwise moved, the overlap portion 431O moves toward the internal portion 431I. Upon satisfactory overlap of the overlap portion 431O and the internal portion 431I, the closure 441A can engage corresponding 441B, and these two closures can secure to one another so that the overlap portion 431O remains at least temporarily restrained in the configuration shown in FIG. 12. In this manner, the overlap portion 431O and the internal portion 431I cooperate to define an internal cavity or compartment 431C within the end 431 of the cargo net 410. This cavity can be substantially similar to the other compartments or cavities described in connection with the sleeves in the embodiments above. Further, the respective straps 70 and 80 can be disposed through the cavity 431C as described in connection with the embodiments above as well.

Generally the overlap portion 431O when folded over the internal portion 431I, optionally with the closures 441A and 441B secured to one another, can form a first sleeve 431S at the first end 431. Likewise, when the overlap portion is overlapped with the internal portion of the second end 432, these overlapping structures form a second sleeve 432S. The respective straps can be disposed through or otherwise within the respective first and second sleeves as described in connection with the embodiments above.

Operation of the cargo net 410 will now be described in connection with FIGS. 11 and 12. The cargo net 410 can be placed over a load as with the embodiments above. Straps 70 and 80 can be placed over or adjacent the ends 431 and 432 of the net 410. Specifically, the strap 70 can be placed over the internal portion 431I of the first end 431. The strap 70 can be placed adjacent the closure 441B, but not obstructing or otherwise overlapping it. The strap 70 also can be placed inside the fold 431F, generally without substantially overlapping the overlap portion 431O.

The overlap portion 431O is folded or otherwise moved in the direction of the arrow F. The closure 441A is joined with the corresponding closure 441B as shown in FIG. 12. There, the overlap portion 431O substantially overlaps the internal portion 431I with a cavity 431C being formed thereby, generally around the strap 70. Generally the strap 70 is disposed within the cavity 431C of the end 431, with the closures 441A and 441B cooperatively retaining the strap 70 at least partially enclosed in the end 431. This process can be repeated for the opposite second end 432 with the other strap 80.

The straps 70 and 80 can be tightened down to further secure a load under the cargo net 410. After use, the closures 441A and 441B can be disassociated from one another to open the overlap portion 431O and expose the underlying strap 70. In this manner, the strap can be readily removed from the cargo net 410. Further, with this structure, the straps can be readily and easily installed relative to the respective ends of the cargo net without having to fish the straps through a closed compartment or cavity of a sleeve defined by the cargo net, as with some of the above embodiments.

A fifth alternative embodiment of the cargo net is shown in FIG. 13 and generally designated 510. This embodiment can be similar to the embodiments above with several exceptions. For example, the cargo net 510 can include a main body 520 and first 531 and second 532 ends. These ends can be substantially similar to one another, so only the first end will be described here. As shown in FIG. 13, the first end 531 can be molded or otherwise constructed to include an upper wall 531UW and a lower wall 531LW. To one or more of these walls a closure can be secured. For example, the upper wall 531UW can include a first closure 541A. The second or lower wall 531LW can include a second closure 541B. These closures can correspond to one another, for example they can be the snaps or other closures described in connection with the embodiment above. The upper wall 531UW can be moved toward the lower wall 531LW or vice versa so that the respective closures 541A and 541B engage and secure to one another so that the upper and lower walls are temporarily secured to one another to form a cavity 531C and a respective sleeve. As with the embodiments above, the respective strap 70 can be disposed through the cavity 531C. Due to the closures 541A and 541B, the cargo net can be effectively secured to the straps 70.

Operation of this embodiment is similar to that of the embodiments above. As an example, the cargo net 510 can be placed over a load to secure it. The straps 70 and 80 are placed within the ends, generally between the upper walls and lower walls of the same. The closures are closed to secure the upper wall and lower wall around the straps to form the cavities. The straps then can be tightened to further secure the load. After the load is transported, the cargo net can be removed. The upper wall and lower wall can be disjoined from one another by disconnecting the closures 541A and 541B. Straps 70 and 80 can be loosened or removed from the cargo net thereafter to release the load.

Figure 14:
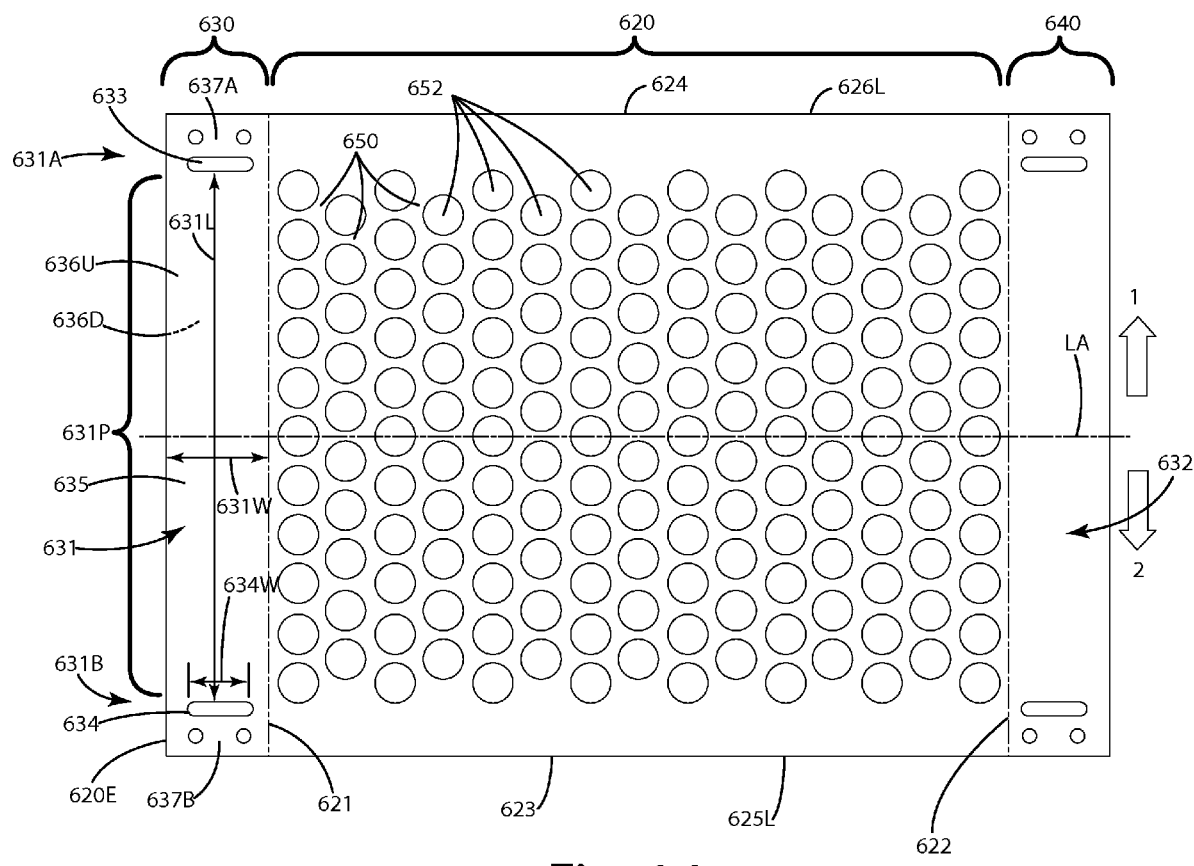
FIG. 14 is a top view of a sixth alternative embodiment of the cargo net including a different configuration of the ends of the cargo net.
Figure 15:
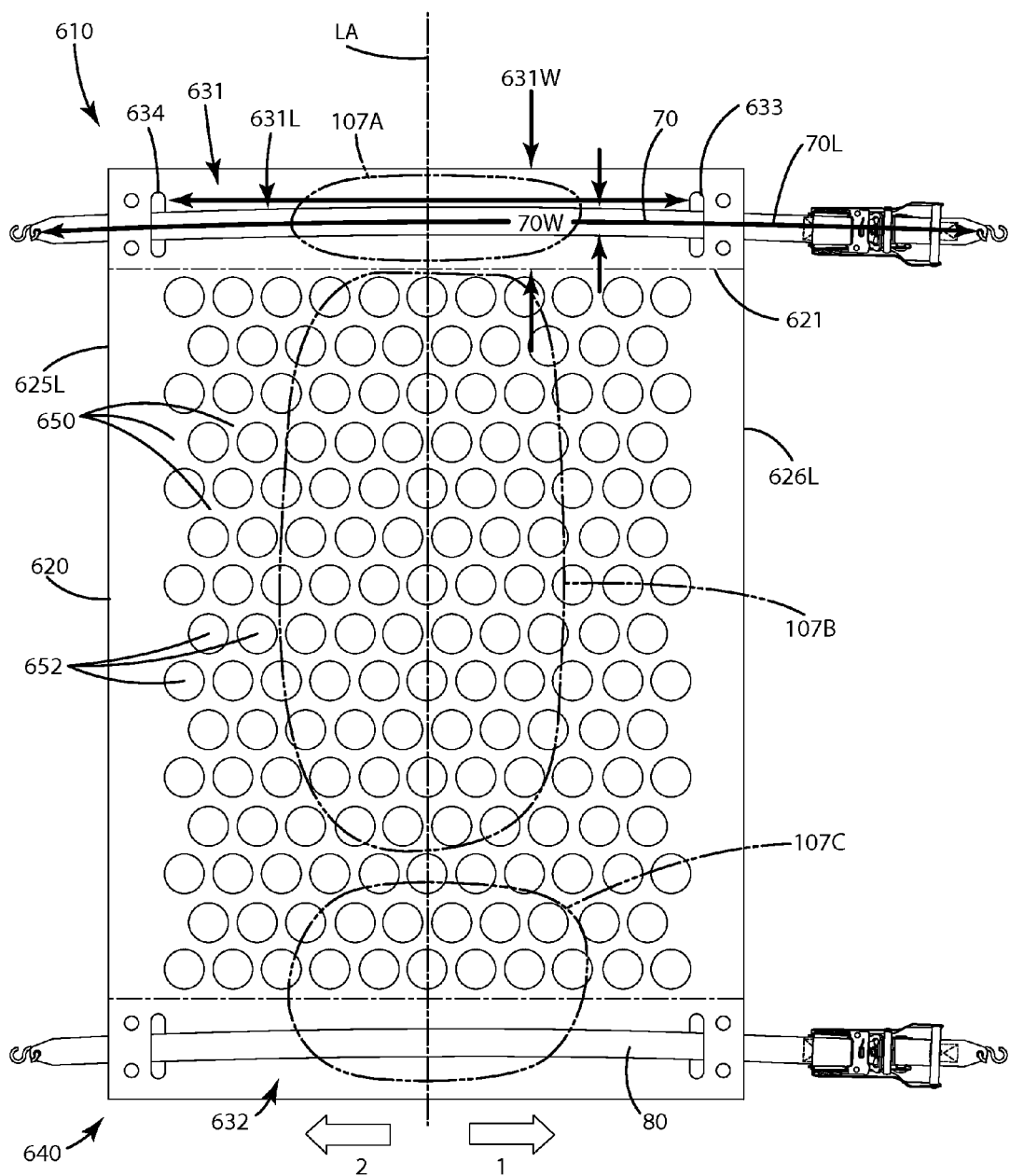
FIG. 15 is a top view of the sixth alternative of the embodiment of the cargo net with straps engaging the ends of the cargo net for securement.
Figure 16:
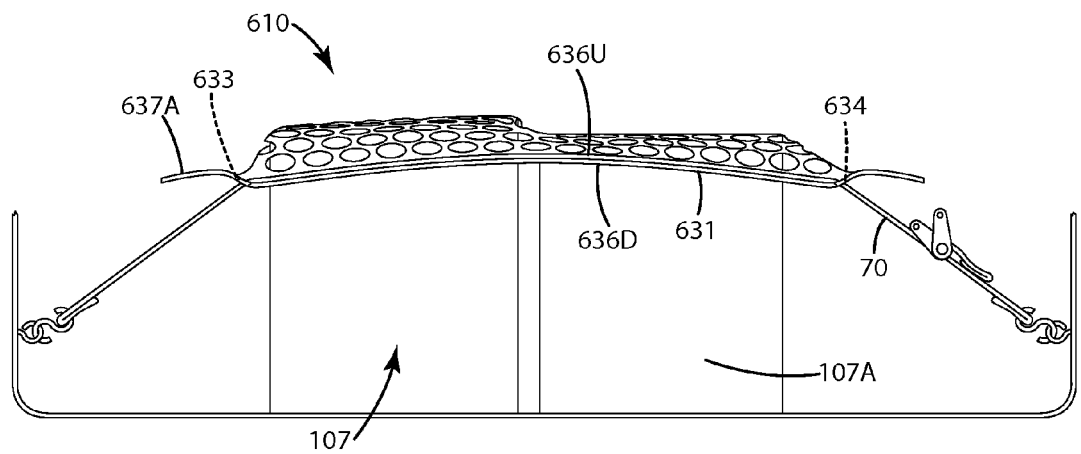
FIG. 16 is an end view of the sixth alternative embodiment of the cargo net holding down cargo.

A sixth alternative embodiment of the cargo net is shown in FIGS. 14-16 and generally designated 610. This embodiment can be similar to the embodiments above with several exceptions. For example, the cargo net 610 can include a main body 620, a first end 530 and a second end 540. The ends can be substantially similar to one another, and can include the same components, so only the first end 630 will be described here. As shown in FIG. 14, the first end 630 is integrally formed and joined with the main body 620. In general, these two structures as well as the second end 640 form a single integral one piece structure. This structure can be formed from a homogenous material, such as the materials described above in connection with the other embodiments. The cargo net can include longitudinal axis LA which can divide the cargo net generally into first side 1 and second side 2 as with the embodiments above. The length and width of this embodiment can be similar to those of the embodiments above as well.

In this embodiment, the network of structural members 650 can extend laterally, crossing or intersecting the longitudinal axis of the cargo net 610. The network of structural members also can form a pattern of openings 652 generally defined by the body 20, and cooperatively defined by the structural members. These openings 652 can be selectively dimensioned so that the members around the openings adjacent the openings capture, retain and hold most items in the cargo bed over which the cargo net 610 is secured. The dimensions of the openings can be the same as those mentioned above. Generally, as illustrated, the openings in this embodiment are circular, but of course, can be other shapes as described in the other embodiments herein. Optionally, the openings 652 can terminate short of the respective first and second ends 630 and 640. Of course, in some applications, these openings might extend somewhat into the respective ends, beyond the respective perimeters 621 and 622.

The body 620, including the structural members 650 can be bounded by a first perimeter 621, a second perimeter 622, a third perimeter 623 and a fourth perimeter 624. The first perimeter 621 and second perimeter 622 can extend across and/or transverse to the longitudinal axis LA. The first perimeter 621 can be bounded by and adjacent the first end 630, generally being disposed between the body 620 and the first end 630. Generally, the openings 652 do not extend beyond the first perimeter 621 into the end 630. Of course, in some limited applications, such openings may extend beyond that perimeter and into the ends as desired.

The first perimeter 621 can either be a continuous, solid, linear perimeter and/or in the form of structural members 650 that are joined with one another and/or near the end. The second perimeter 622 can be located adjacent the opposite second end 640 of the cargo net 610. The second perimeter 622 can be similar to the first perimeter except that it forms a boundary between the main body 620 and the second end 640. The second perimeter 622 can extend laterally across the longitudinal axis from the first side to the second side, as can the first perimeter 621. Both of these perimeters can also extend from the first lateral edge 625L of the body 20 to the second lateral edge 626L of the body 20. Again, these lateral edges are similar to those in the embodiments above in that they generally form the outermost boundaries or edges of the cargo net 610 on the opposite sides 1 and 2 across the longitudinal axis LA.

As shown in FIG. 14, the third perimeter 623 and fourth perimeter 624 of the body 620 can extend along and/or be adjacent to the first lateral edge 625L and second lateral edge 626L, respectively. The third perimeter 23 can be disposed substantially only on the first side 1 of the longitudinal axis LA. The fourth perimeter 24 can be disposed substantially only on the second side 2 of the longitudinal axis LA, opposite the third perimeter 623. The third and fourth perimeters, and third and fourth lateral edges, can optionally be parallel to one another, and the longitudinal axis. These perimeters optionally also can be perpendicular to the respective ends 630 and 640 and yet more particularly to the elongated strap engagement bases 631 and 632 of those ends.

As shown in FIG. 14, the respective ends 630 and 640 include several different components. It should be noted that the ends 630 and 640 can be generally identical, so only the first end 630 will be described in further detail here. To begin, the first end 630 can include an elongated strap engagement base 631. This first elongated strap engagement base can extend substantially across the longitudinal axis LA from the first side 1 to the second side 2, generally in directions toward the respective first lateral edge 625L and second lateral edge 626L. The first elongated strap engagement base can be bounded from the body 620 by the first perimeter 621. Optionally, the first elongated strap engagement base and the second strap engagement base are joined with the network of structural member 650 at the respective perimeters 621 and 622.

Optionally, first elongated strap engagement base 631, and in particular, its primary portion 631P, can be substantially continuous, which means these elements can be void of a substantial number of openings—unlike the very open structure of the body 620. Substantially continuous also can mean that there is generally more material than open space along a length of the elongated strap engagement base and/or its primary portion. For example, from end to end of the first elongated strap engagement base, there can be 51%-100% material and 49%-0% openings occupying this space. Of course, other percentages can be selected depending on the particular application and the holding strength of the elongated strap engagement base. Further, a substantially continuous strap engagement base 631 can be void of any additional openings between the first strap slot 633 and the second strap slot 634.

Generally, the first elongated strap engagement base can terminate adjacent the first perimeter 621. The first elongated strap engagement base can include a base body 635. The first elongated strap engagement base 631 also can include a first base end 631A and a second base end 631B. The first base end 631A can define the first strap slot 633 and the second base end 631B can define the second strap slot 634. Optionally, the first end 630 defines the first strap slot 633 on the first side 1 of the longitudinal axis LA and the second strap slot 634 on the second side 2 of the longitudinal axis LA. Optionally, the strap slots can be symmetric about the longitudinal axis LA so that the longitudinal axis LA is about midway between the first strap slot and the second strap slot. Further optionally, the respective opposing ends of the second elongated strap engagement base can include respective ends with respective third and fourth strap slots defined therein.

As shown in FIG. 14, the first base end 631A is located on the first side 1, whereas the second base end 631B is located on the second side 2. The second base end also defines the second strap slot 631B on the second side 2. The first elongated strap engagement base can include an upward facing surface 636U and a downward facing surface 636D. The upward facing surface 636U is one that generally faces upward when the net is applied to cargo, and can be engaged by a strap as further described below. When in use, the downward facing surface 636D generally faces downward toward the cargo that is being held by the cargo net 610 and/or toward the pallet or bed of the conveyance with which the cargo net 610 is being utilized.

As shown in FIGS. 14 and 15, the first base end 631A and second base end 631B can include a first overlapping bridge 637A and a second overlapping bridge 637B, respectively. The first and second overlapping bridges are of lengths that are less than the overall length 631L of the primary portion 631P of the first elongated strap engagement base 631. Optionally, the first end 630 and in particular the first elongated strap engagement base 631, and even more particularly, the primary portion 631P of the first elongated strap engagement base 631 can define a length 631L that extends between the first strap slot and the second strap slot. Within this length, the primary portion 631P of the first elongated strap engagement base 631 can be substantially continuous and uninterrupted between those first strap slot and the second strap slot, generally formed without any openings therebetween.

The primary portion 631P of the first strap elongated engagement base, or more generally the first strap elongated strap engagement base 631 can include a first base length 631L. The first base length can be defined between the first strap slot and the second strap slot. The primary portion 631P of the first elongated strap engagement base 631 also can define a first base width 631W. This can extend generally from the terminal edge 620E of the cargo net 620 to the first perimeter 621. This width 631W can be selected to be wider than the respective widths or longest dimensions of the slots 633 and 634 so that there is enough material surrounding the slots so that the portions of the cargo net in those areas will not tear, rip or become damaged.

As shown in FIG. 15, the cargo net 610 can be used in conjunction with one or more straps 70 and 80. These straps 70 and 80 can be identical to the straps described above in connection with other embodiments. The straps 70 and 80 can be substantially identical, therefore only the first strap 70 will be described here. Specifically, the first strap 70 can include an overall first strap length 70L. This strap length can depend on how long the strap should be to effectively fasten down cargo. The first strap length 70L can be greater than the length 631L of the primary portion of the first elongated strap engagement base and/or the entire length of the first elongated strap engagement base from one lateral edge 625L to another 626L. The length 70L can be optionally about 2 inches to about 6 feet greater, further optionally about 6 inches to about 1 foot greater, or other distances greater as desired. The width 70W of the strap, however, can be less than the first base width 631W, or put another way, the first base width 631W can be greater than the first strap width 70W. This can ensure that the strap effectively engages a larger portion of the upward facing surface 631U of the first elongated strap engagement base 631. In this manner, the strap can effectively have a larger surface area of the cargo net 610 to engage and thereby hold the cargo net in place thereby better securing the cargo.

Optionally, the first base width 631W can be approximately 1 inch to about 1 foot, further optionally about 2 inches to about 6 inches greater than the first strap width 70W. In some cases, the first base width 631W can be sufficiently wide to accommodate multiple first straps there across extending across the first elongated strap engagement base 631. Further optionally, in some applications, the respective ends 630 and 640 can define multiple strap slots on each the first and second sides. In this manner, the ends can each accommodate one, two, three or more straps, depending on the particular cargo. Further, in some cases, where the center portion of the body 620 might benefit from being strapped down, one of the ends 630 and its respective first elongated strap engagement base, strap slots, and base ends can be disposed or replicated within the body 620, generally extending across from one lateral edge to another. The different components of the ends in this location can be substantially identical to the ends as describe above.

As mentioned above, the ends of the first elongated strap engagement base include the slots 633 and 634. These slots can be in the form of elongated holes that extend completely through the respective ends 630 and 640. Optionally, the slots can be in the form of elongated holes, having a length greater than a width, or generally different dimensions along axes that are perpendicular to one another. Of course, a variety of other types of slots can be formed. In some cases, the slots can also have equal dimensions across such axes so that the slots are generally symmetric across a central point.

The slots as shown in FIGS. 14 and 15 can be formed as elongated rectangular openings with rounded ends. The slots 633 and 634 include at least one dimension that is sufficient to accommodate a respective strap that is placed through a slot. The slots also can be large enough so that attachment elements, such as hooks, and/or ratcheting mechanisms, of the respective straps can fit through the slots easily, without stretching or tearing the slots or adjacent material, which might compromise the integrity of the cargo net and its holding ability. Optionally, the slots can include a slot width 634W. The slot width 634W can be less than the first base width 631W, but greater than the strap width 70W as shown in FIG. 15 of a respective strap connected to the cargo net. Further, although shown at opposing ends, there may be additional slots disposed within the primary portion 631P of the first elongated strap engagement base 631, depending on the particular application. Generally, the overlapping bridges 637A and 637B can lay across the slots from the primary portion 631P of the first elongated strap engagement base 631.

The cargo net and its components can be constructed from an integrally formed single piece of material. This material can be any of the materials described in connection with the other embodiments above. The material also can be substantially flat. The respective components, such as the slots, openings, etc., can be die cut, laser cut, stamped or otherwise formed through and/or in the material as desired. The material also can be a stretchable elastic material. Further, the material in the respective components described above can be monolithically formed as a single piece structure, having one or more materials disposed homogenously throughout the single piece structure.

Operation of the cargo net 610 of the sixth alternative embodiment will now be described in further detail, but it is noted that it can be operated and disposed over cargo within a bed of a conveyance or over a pallet similar to any of the embodiments described above. Generally, as shown in FIG. 15, the cargo net 610 is laid out, optionally over cargo in use. The first strap 70 can be extended through the first strap slot 634 across the first elongated strap engagement base 631 and then back through the second strap slot 633. The first strap traverses the longitudinal axis LA and protrudes beyond the first and second sides 1 and 2 and/or lateral edges 625L and 626L of the cargo net 610. The strap, however, remains generally above or beyond the perimeter 621 of the body 620. The strap itself as shown in FIGS. 15 and 16 also extends generally under the respective first 637A and second 637B overlapping bridges. As shown there, the strap also extends over the upward facing surface 636U of the first elongated strap engagement base 631. Generally, the strap is weaved under the first overlapping bridge 637A through the first strap slot 633, over the first elongated strap engagement base 631 back through the second strap slot 634 and under the second overlapping bridge 637B. The strap 70 ultimately extends to points of attachment along the bed or pallet to which the cargo net 610 is overlaid. The second strap 80 can be placed through the second end 640 in a manner similar to that used to install the first strap.

The cargo net 610 can be placed over a load of cargo 107 that can include a first cargo portion 107A, a second cargo portion 107C and a third cargo portion 107B disposed between the first and second cargo portions. The respective portions of the cargo can be adjusted depending on their location and the overlap of the cargo net. The first strap 70 can be tightened so that the first elongated strap engagement base, adjacent the first strap engages the first cargo portion 107A. The second strap can be tightened so that its respective second elongated strap engagement base 632, adjacent the second strap 80 engages and secures the second cargo portion 107C. Securement of the first strap and the second strap can cause the body 620 to further secure the third load portion 107B.

Optionally, where the straps 70 and 80 are ratchet straps, the tightening of the respective straps can include moving a ratchet lever to rotate a spool and wind a portion of the strap on the spool as described in connection with the embodiments above.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments or the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A cargo net detachably attached to at least one of a transport bed and a pallet, the cargo net comprising:
 a body including a network of structural members and a longitudinal axis, the body including a first lateral edge disposed on a first side of the longitudinal axis and a second lateral edge disposed on a second side of the longitudinal axis opposite the first side;
 a first end including a first elongated strap engagement base, the first elongated strap engagement base joined with the network of structural members, the first elongated strap engagement base including a first base end located on the first side and a second base end located on the second side, the first base end defining a first strap slot, the second base end defining a second strap slot, the first elongated strap engagement base including an upward facing surface and a downward facing surface, the first elongated strap engagement base including a primary portion, the first base end including a first overlapping bridge adjacent the first strap slot but located across the first strap slot from the primary portion of the first elongated strap engagement base, the first base end including a second overlapping bridge adjacent the second strap slot but located across the second strap slot from the primary portion of the first elongated strap engagement base;
 a second end including a second elongated strap engagement base, the second elongated strap engagement base joined with the network of structural members, the second end being distal from the first end so that the network of structural members are disposed between the first end and the second end;

a first strap, separately constructed from the body, first end and second end, the first strap joined with the first end so that the first overlapping bridge is disposed over the first strap adjacent the first base end, the first strap being disposed through the first strap slot, the first strap extending over and engaging the upward facing surface of the first elongated strap engagement base along the primary portion, the first strap being disposed through the second strap slot and under the second overlapping bridge, with the second overlapping bridge being disposed over the first strap adjacent the second base end, the first strap extending beyond the first lateral edge and the second lateral edge;

a second strap, separately constructed from the body, first end and second end, the second strap disposed over the second elongated strap engagement base with the second strap extending beyond the first lateral edge and the second lateral edge;

wherein the first and second strap are selectively attachable to at least one of a transport bed and a pallet, whereby a user can selectively tighten the first strap and second strap to secure cargo under the cargo net, with the body securing a portion of the cargo located between the first end and the second end.

2. The cargo net of claim 1,
wherein the first and second straps are ratchet straps, each having a ratcheting mechanism that selectively tightens or reduces a length of at least one of the first and second straps.

3. The cargo net of claim 2,
wherein the first strap includes a first strap end and a second strap end,
wherein the first strap end includes a first strap attachment element,
wherein the second strap end includes a second strap attachment element,
wherein the first strap attachment element is located laterally outward from the first lateral edge,
wherein the second strap attachment element is located laterally outward from the second lateral edge,
wherein the ratcheting mechanism of the first ratchet strap is located laterally outward from the first lateral edge.

4. The cargo net of claim 1,
wherein the primary portion extends continuously between the first strap slot and the second strap slot,
wherein the body defines a plurality of body openings,
wherein the body openings are not defined by the primary portion of the first elongated strap engagement base.

5. The cargo net of claim 1,
wherein the body includes a first perimeter located adjacent and joined integrally with the first elongated strap engagement base,
wherein the body includes a second perimeter located adjacent and joined integrally with the second elongated strap engagement base,
wherein the body, first perimeter, first elongated strap engagement base, second perimeter and second elongated strap engagement base are monolithically formed as a single piece structure,
wherein the single piece structure is constructed from a stretchable, elastic material.

6. The cargo net of claim 1,
wherein the second end includes a second elongated strap engagement base having a third base end located on the first side and a fourth base end located on the second side, the third base end defining a third strap slot, the fourth base end defining a fourth strap slot, the second elongated strap engagement base including an upward facing surface and a downward facing surface, the second elongated strap engagement base including another primary portion, the third base end including a third overlapping bridge adjacent the third strap slot but located across the third strap slot from the primary portion of the second elongated strap engagement base, the third base end including a fourth overlapping bridge adjacent the fourth strap slot but located across the fourth strap slot from the primary portion of the second elongated strap engagement base.

7. The cargo net of claim 1,
wherein the primary portion of the first elongated strap engagement base is substantially continuous between the first strap slot and the second strap slot, without any apertures defined in the primary portion of the first elongated strap engagement base therebetween,
wherein the primary portion of the first elongated strap engagement base includes a first base width and a first base length, the first base length being defined between the first strap slot and the second strap slot,
wherein the first strap includes a first strap length and a first strap width,
wherein the first base width is greater than the first strap width,
wherein the first strap length is greater than the first base length.

8. The cargo net of claim 1,
wherein the a network of structural members cooperatively define a plurality of openings,
wherein the plurality of openings are of a different shape than the first strap slot and the second strap slot,
wherein the plurality of openings terminate short of the first and second ends.

9. A method of operating the cargo net of claim 1 comprising:
extending the first strap through the first strap slot, over the first elongated strap engagement base, and through the second strap slot so that the first strap traverses the longitudinal axis and protrudes beyond the first and second sides of the body,
extending the second strap through a third strap slot, over the second elongated strap engagement base, and through a fourth strap slot so that the second strap traverses the longitudinal axis and protrudes beyond the first and second sides of the body,
placing the cargo net over a load of cargo including a first cargo portion, a second cargo portion distal from the first cargo portion and a third cargo portion disposed between the first and second cargo portions,
tightening the first strap so that the first elongated strap engagement base, adjacent the first strap secures the first cargo portion;
tightening the second strap so that the second elongated strap engagement base, adjacent the second strap secures the second cargo portion,
wherein the tightening of the first strap and the second strap causes the body to further secure the third load portion.

10. The method of claim 9,
wherein the first and second straps are each ratchet straps, each ratchet strap including a ratchet lever, a spool and at least one elongated web, wherein the tightening includes moving the ratchet lever to rotate the spool and wind the at least one elongated web on the spool.

\* \* \* \* \*